Patented Feb. 27, 1940

2,191,820

UNITED STATES PATENT OFFICE 2,191,820

PROCESS FOR THE PREPARATION OF 2-NITRONAPHTHALENE - 4,8 - DISULPHONIC ACID

Filippo Beretta, Milan, Italy, assignor to "Montecatini" Società Generale per l'Industria Mineraria e Chimica, Milan, Italy, a corporation of Italy No Drawing. Application October 31, 1938, Serial No. 238,076. In Italy November 8, 1937

4 Claims. (Cl. 260—505)

The following method has been proposed for the preparation of 2-nitronaphthalene-4,8-disulphonic acid: 1,5-naphthalenedisulphonic acid is dispersed in sulphuric acid at 66° Bé. and then nitrated in a mixture of sulphuric and nitric acids containing about 5% water. In this way, however, a mixture of the two isomers: 1-nitro-4,8-naphthalenedisulphonic acid and 2-nitro-4,8-naphthalenedisulhponic acid is always obtained. On lowering the temperature of nitration, the formation of isomer 2-4,8 prevails, but isomer 1-4,8 is still present, so that it is necessary to separate the two isomers by means of the different solubility of their sodium salts.

I have now found that when operating at ordinary temperature, that is, below 40° C., but avoiding the presence of water during the operation, the —NO₂ group enters exclusively into the beta-position and with a practically quantitative yield.

The process may be carried out as follows: 1,5-naphthalenedisulphonic acide is dispersed in a mixture of monohydrated sulphuric acid and oleum; it is cooled; an anhydrous mixture of sulphuric and nitric acids is slowly added, taking care that the temperature does not increase too much (keeping it, say, under 30° C.); the mass is continually stirred for a certain time, it is discharged into water and treated with magnesia; the magnesium salt formed of the 2-nitronaphthalene-4,8-disulphonic acid is washed with water on the filter.

*Example.*—360 kg. of 1,5-naphthalenedisulphonic acid at 80% and 800 kg. of oleum with a 60% SO₃ content are introduced into 400 kg. of monohydrated sulphuric acid, taking care that the temperature does not xceed 40° C. The solution is cooled down to 25° C. and 165 kg. of an anhydrous mixture of sulphuric and nitric acids with a 40% HNO₃ content are slowly added into it while stirring, taking care that the temperature does not exceed 30° C. When the introduction of the nitrating-mixture is finished, the whole mixture is stirred for 6 to 7 hours, at a temperature of 30 to 35° C. The mass is then discharged into water and is treated with 60 kg. of magnesia. The magnesium salt of the 2-nitronaphthalene-4,8-disulphonic acid is filtered at low temperature and washed with water on the filter. The resulting yield is about 95%.

The advantages obtained by this invention are as follows:

1. A pure, 2-nitronaphthalene-4,8-disulphonic acid, free from isomers, is obtained.
2. A reaction with a practically quantitative yield is effected.
3. The nitration is executed at ordinary temperature, avoiding thus the use of brine.

Having now particularly described and ascertained the nature of my said invention and in what manner the same is to be performed, I declare that what I claim is:

1. The process of manufacture of 2-nitronaphthalene-4,8-disulphonic acid, in which the 1,5-naphthalenedisulphonic acid is subjected to an anhydrous nitration.

2. The process of manufacture of 2-nitronaphthalene-4,8-disulphonic acid, in which the 1,5-naphthalenedisulphonic acid is subjected to an anhydrous nitration at a temperature below 40° C.

3. The process of manufacture of 2-nitronaphthalene-4,8-disulphonic acid, in which the 1,5-naphthalenedisulphonic acid is subjected to an anhydrous nitration at a temperature below 40° C., by dispersing it in monohydrated sulphuric acid and oleum and by making it react with an anhydrous mixture of sulphuric and nitric acids.

4. The process according to claim 3, in which the nitration-mass obtained is treated with magnesia, in order to precipitate the magnesium salt of the 2-nitronaphthalene-4,8-disulphonic acid.

FILIPPO BERETTA.